(12) United States Patent
Menjak et al.

(10) Patent No.: US 6,454,044 B1
(45) Date of Patent: Sep. 24, 2002

(54) GEARING WITHOUT BACKLASH FOR ELECTRIC POWER STEERING

(75) Inventors: Zdravko Menjak, Troy; Ratko Menjak, Frankenmuth, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/836,874

(22) Filed: Apr. 17, 2001

(51) Int. Cl.[7] .................. B62D 5/04; F16H 55/18
(52) U.S. Cl. ........................... 180/444; 74/440
(58) Field of Search ............... 180/444; 74/440

(56) References Cited

U.S. PATENT DOCUMENTS

| | | | |
|---|---|---|---|
| 4,011,764 A | | 3/1977 | Buck et al. |
| 4,037,680 A | | 7/1977 | Grove |
| 4,667,759 A | * | 5/1987 | Hashimoto et al. ......... 180/444 |
| 4,724,714 A | | 2/1988 | Iwasaki et al. |

* cited by examiner

Primary Examiner—Avraham Lerner
Assistant Examiner—Matt Luby
(74) Attorney, Agent, or Firm—Edmund P. Anderson

(57) ABSTRACT

A steering gear system for an electric power steering system includes a motor, a gearing mechanism driven by the motor, a drive gear in mechanical communication with the gearing mechanism, a ball nut driven by the drive gear, and a rack laterally positioned through the ball nut and configured to translate the ball nut upon rotation thereof. The gearing mechanism includes a pinion and a sub-pinion in mechanical communication with each other held together but urged apart by a resilient member disposed therebetween. The pinion is urged away from a rotor shaft of the motor by at least one spring to compensate for angular motion of the pinion on the rotor shaft. Helical gear threads disposed on the pinion and sub-pinion are configured to engage corresponding threads on the drive gear. The resilient member forces the flanks of the threads on the pinion and the sub-pinion to remain in contact with corresponding threads on the drive gear regardless of the direction of rotation of the pinion/sub-pinion assembly.

16 Claims, 3 Drawing Sheets

GEARING WITHOUT BACKLASH FOR ELECTRIC POWER STEERING

TECHNICAL FIELD

This invention relates to the elimination of backlash between gears, and, more particularly, to the elimination of backlash between the meshed gearing in an electric power steering system.

BACKGROUND

In the prior art, rack and pinion steering devices for motor vehicles are well known and generally comprise a motor driven pinion that rotates a nut through which a steering rod translates. The rack forms a part of the steering rod to which steerable wheels of the motor vehicle are attached. In these prior art steering devices, backlash, or clearance around a tooth of the driver gear as it fills the space between two teeth of the driven gear, is necessary in order to permit relative motion between the two gears. In a gear system with no backlash, the meshing of the teeth between the gears will be so tight that, absence any deflection of the teeth, the gears will bind and cause the system to jam. However, in a gear system with any degree of backlash, an audible noise known as "lash" is produced by the contact of the teeth of one gear with the teeth of another gear. While lash is not indicative of a defect in the gearing system, it often proves to be an annoyance and it is therefore desired to be minimized as much as practicable.

Various attempts to de-lash gear systems are also well known in the prior art. In a rack and pinion system in which the gear sets are of a parallel axis structure, shims may be used to bias the pinion against the rack. The use of shims, however, requires a significant amount of trial and error technique in order to find the correct amount of backlash needed to allow the system to function properly. Furthermore, the installation of shims within a gearing system requires periodic maintenance to correct any slight changes in the system that occur over time due to vibration and normal use.

Coil springs are also often used to load rack and pinion systems and to urge a rack shaft resiliently against a pinion shaft to adjust the backlash and eliminate any lost motion between the two gears. In a variation of this system, the pinion may be resiliently urged against the rack. In either system utilizing resilient coil springs, the loading of either the pinion or the rack in one direction takes up the clearance between the teeth of the rack and the teeth of the pinion. However, because in the driving of a gear there is generally only single flank contact between the teeth of the pinion and the teeth of the rack, the driving of the pinion in the opposite direction will usually result in lost motion and cause backlash.

Still another system used to drive the rack is a belt transmission system. In such a system, the pinion drives a pulley, which is connected to the ball nut with a belt. Rotation of the pulley necessitates the movement of the belt, which drives the ball nut, thereby causing the ball screw, which is integrally formed with the rack, to translate the ball nut. In such a system, backlash is initially eliminated due to the absence of gears; however, over time the belt stretches and the slack in the belt introduces a certain amount of backlash to the system. Because the belt stretches, corrective maintenance is required on a more frequent basis. Furthermore, replacement of worn or broken belts is often a difficult task that requires at least partial disassembly of the rack and pinion system.

SUMMARY

A steering gear system is described for an electric power steering system in which a directional change in the driving of a pinion will limit the amount of backlash experienced by the rack and pinion gears or eliminate the backlash altogether. The system will further limit the amount of backlash between a rotor shaft of a drive motor and the pinion when the pinion or the rotor shaft are moved angularly relative to each other. The steering gear system utilizes a gearing mechanism in which a pinion and a sub-pinion are urged apart by a resilient member such that the threads on each are always in contact with the flanks of the teeth on the rack. The steering gear also utilizes at least one spring placed between the rotor shaft and the pinion to enable rotor shaft to "float" within the pinion in order to compensate for angular motion of the rotor shaft relative to the pinion.

The steering gear system includes a motor, a gearing mechanism driven by the motor, a drive gear in mechanical communication with the gearing mechanism, a ball nut driven by the drive gear, and a rack laterally positioned through the ball nut and configured to translate the ball nut upon rotation thereof. The gearing mechanism includes a pinion and a sub-pinion in mechanical communication with each other held in union but urged apart by a resilient member disposed therebetween and at least one spring positioned between an inner surface of the pinion and an outer surface of the rotor shaft. Helical gear threads disposed on the pinion and sub-pinion are configured to engage corresponding threads on the drive gear. The resilient member forces the flanks of the threads on the pinion and the sub-pinion to remain in contact with corresponding threads on the drive gear regardless of the direction of rotation of the pinion/sub-pinion assembly.

The pinion comprises a body portion and a protrusion, and the sub-pinion comprises a body portion and a hole configured to receive the protrusion of the pinion. Splines are disposed on the outside surface of the protrusion and the inside surface of the hole of the sub-pinion and are interengageable to prevent the axial rotation of the pinion relative to the sub-pinion. A retaining ring is positioned over the part of the protrusion that extends through the body portion of the sub-pinion to hold the pinion and the sub-pinion in union. The spring between the pinion and the rotor shaft, which may be frictionally retained therebetween or recessed into either the pinion or the rotor shaft, is a ring-shaped member-configured to deform in a radial direction when flexed in an axial direction and is configured to urge the pinion away from the outer surface of the rotor shaft when the spring is received over the rotor shaft. The resilient member is configured to urge the pinion and the sub-pinion apart as each are held in union and is positioned in a channel either in the body of the sub-pinion concentrically about the hole or in the body of the pinion concentrically about the protrusion. The entire gearing mechanism may be enclosed in a housing installable in the engine compartment of the motor vehicle.

The above system eliminates the backlash associated with the directional changes of pinions of the prior art as well as backlash caused by angular movement of the rotor shaft relative to the pinion. The elimination of backlash improves the performance, quality, and efficiency of the gearing system by maintaining contact between the teeth of the pinion and the teeth of the rack while eliminating the intermittent contact therebetween, which can contribute to wear of the teeth of the system. The elimination of intermittent contact between the teeth of the gears further serves to limit the amount of noise generated by the system.

DETAILED DESCRIPTION

Figure 1:
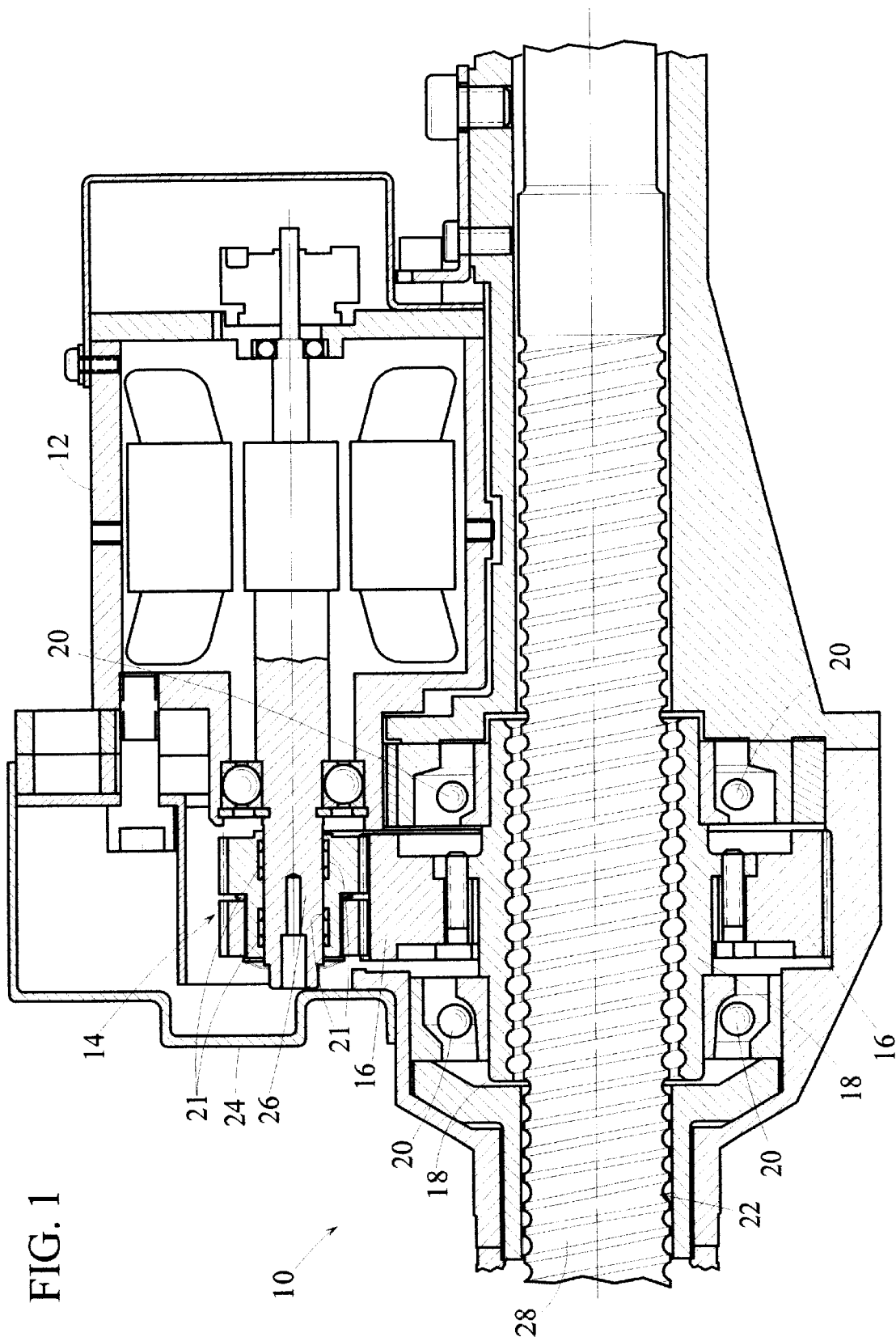
FIG. 1 is a side elevation sectional view of a steering gear system incorporating a gearing mechanism comprising a pinion and sub-pinion in mechanical communication with each other and urged apart by a resilient member and positioned on a rotor shaft of a motor.

Referring to FIG. 1, a steering gear system for an electric power steering system is shown generally at 10. Steering gear system 10 comprises a motor 12, a gearing mechanism, shown generally at 14, driven by motor 12, a drive gear 16 driven by gearing mechanism 14, at least one spring 21 disposed between a rotor shaft 26 and gearing mechanism 14, a ball nut 18 rotatably supported by bearings 20 and driven by drive gear 16, and a rack, shown generally at 22, that translates ball nut 18 and has end portions that are connectable to steerable wheels (not shown) of a motor vehicle. Gearing mechanism 14 is enclosed in a housing 24 and is mounted so as to rotate the steerable wheels out of the plane in which the motor vehicle is traveling to effectuate a change in direction of the motor vehicle.

Steering gear system 10 is configured to change the axially rotational motion of rotor shaft 26 of motor 12 into the lateral movement of rack 22. Motor 12, the structure and operation of which are well known in the art, is positioned within steering gear system 10 such that rotor shaft 26 of motor 12 is parallel with rack 22 and in direct communication with ball nut 18 through springs 21, gearing mechanism 14, and drive gear 16. Gearing mechanism 14 is described in greater detail below. Ball nut 18 is in mechanical communication with a ball screw 28, which forms an intermediate portion of rack 22, and which translates through ball nut 18 upon rotation of rotor shaft 26. The structure and operation of both ball nut 18 and ball screw 28 are well known in the art.

Figure 2A:
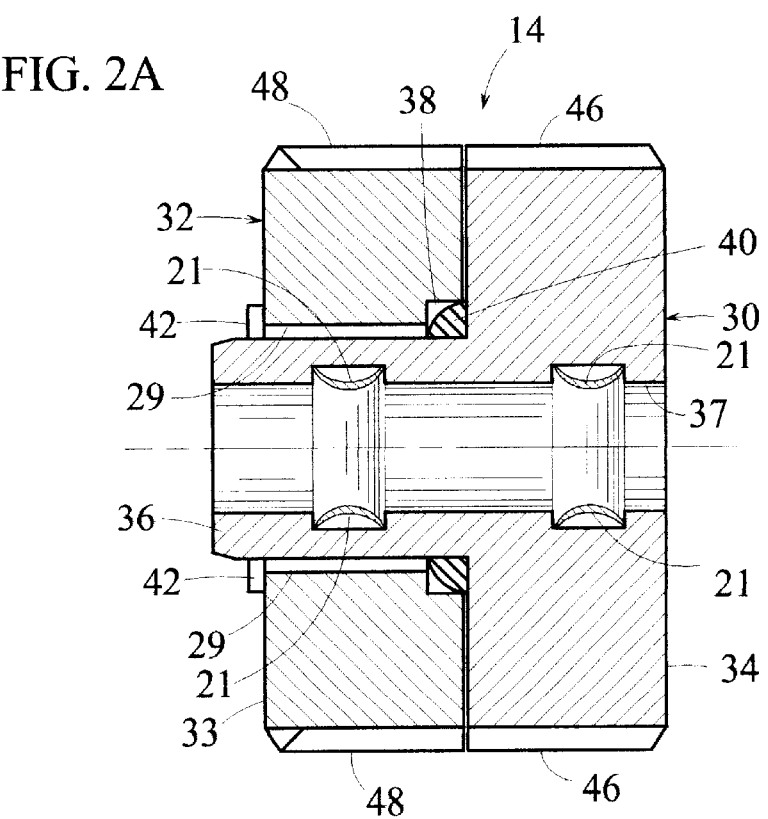
FIG. 2A is a cross section view of the gearing mechanism.
Figure 2B:
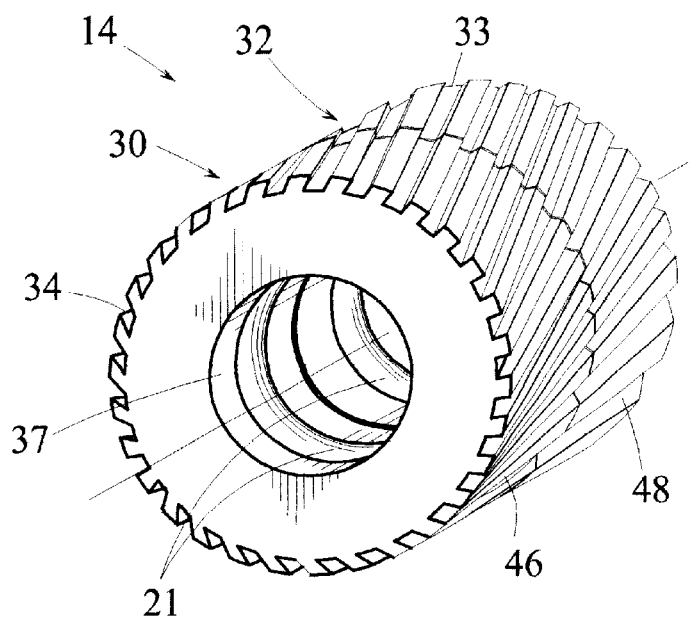
FIG. 2B is a perspective view of the gearing mechanism.

Referring now to FIGS. 2A and 2B, gearing mechanism 14 is shown in greater detail. Gearing mechanism 14 comprises a pinion, shown generally at 30, and a sub-pinion, shown generally at 32, connected together in an intimate relationship and biased apart by a resilient member 40. Pinion 30 and sub-pinion 32 are configured to have male and female orientations respectively, thereby allowing pinion 30 to be received in sub-pinion 32. In a preferred embodiment, threads 46 form helical gear teeth on the outside of pinion 30 and threads 48 form helical gear teeth on the outside of sub-pinion 32. The helical gear teeth engage corresponding threads (shown below with reference to FIG. 4) that form helical gear teeth on the drive gear. Pinion 30 comprises a body portion 34 and a protrusion 36. Protrusion 36 has splines 29, the faces of which are shown, positioned thereupon. Protrusion 36 is received in and extends through a hole (not shown) in a body portion 33 of sub-pinion 32, the inside surface of which contains splines (not shown) that matingly engage splines 29 positioned on protrusion 36. Splines 29 positioned on protrusion 36 and the splines on the inside surface of the hole in sub-pinion 32 are configured to engage each other, thereby eliminating any clearance therebetween.

Resilient member 40 is positioned at an interface of pinion 30 and sub-pinion 32. In a preferred embodiment, a recess 38 is formed or cut within a face of sub-pinion 32 that engages pinion 30 and is configured to accommodate resilient member 40 positioned between pinion 30 and sub-pinion 32 to urge pinion 30 and sub-pinion 32 away from each other. Alternately, recess 38 may be formed or cut within a face of pinion 30 that engages sub-pinion 32. Resilient member 40 may be a wave spring, a Belleville washer, or a similar device. A retaining ring 42 is positioned over the portion of protrusion 36 that extends through the hole in sub-pinion 32. Retaining ring 42 maintains pinion 30 and sub-pinion 32 in union and is sufficiently tight to prevent the casual removal of sub-pinion 32 from protrusion 36.

A hole 37 is formed, cut, or drilled in a face of pinion 30 opposing sub-pinion 32 and is dimensioned to extend completely through pinion 30 and to receive the rotor shaft. Springs 21 are positioned on an inner surface of hole 37. Each spring 21 is a ring-shaped structure having an hourglass-shaped cross section and flexes sufficiently in an axial direction to allow the body portion thereof to deform in the radial direction. Upon deforming in the radial direction, the body portion of each spring 21 makes contact with the rotor shaft while the edges of each spring 21 make contact with an inner wall of hole 37 extending through pinion 30. Radial forces exerted by springs 21 cause springs 21 to be frictionally retained between the rotor shaft and gearing mechanism 14 and effect a frictional force between the rotor shaft and gearing mechanism 14 that is great enough during normal operation of the motor to transfer functional torque from the motor to gearing mechanism 14. Springs 21 may be recessed into either the rotor shaft or pinion 30 and are tensioned such that in the case of very large incidental torque forces from the motor, springs 21 will "slip" on the rotor shaft, thereby protecting the gearing teeth, the ball nut/screw components, and the motor from overload conditions.

Figure 3:
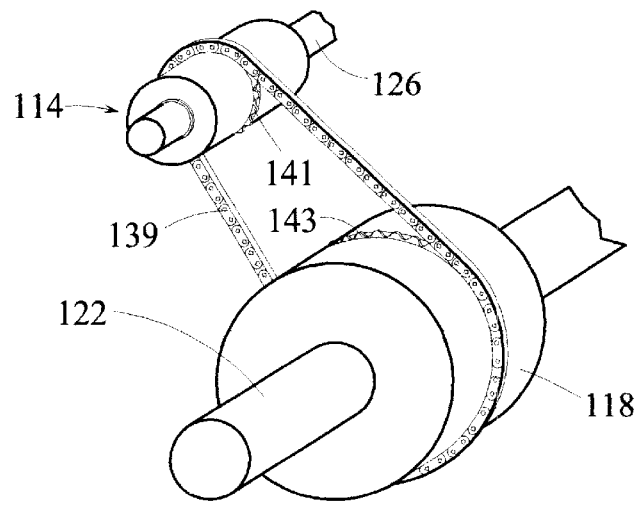
FIG. 3 is a perspective view of an alternate embodiment of a gearing mechanism drivable by a chain and sprocket arrangement.

In FIG. 3, an alternate embodiment of a gearing mechanism is shown generally at 114. Gearing mechanism 114 is drivable by a chain 139 connected between a sprocket 141 mounted on gearing mechanism 114 and a sprocket 143 mounted on a ball nut 118 through which a rack 122 translates. Rotation of a rotor shaft 126 necessitates the rotation and operation of gearing mechanism 114 in a manner similar to that of the gearing mechanism of the main embodiment. However, in a system utilizing gearing mechanism 114, the need for a drive gear in communication with the ball nut is eliminated and the drive gear is replaced with chain 139. In gearing mechanism 114, springs (not shown) similar to springs 21 shown in FIGS. 1, 2A, and 2B are positioned between rotor shaft 126 and an inside surface of gearing mechanism 114. The springs effect a frictional force great enough during normal operation of the motor to transfer functional torque from the motor to gearing mechanism 114 and, as in the main embodiment, they are tensioned such that in the case of large incidental torque forces they will slip on the rotor shaft.

Figure 4:
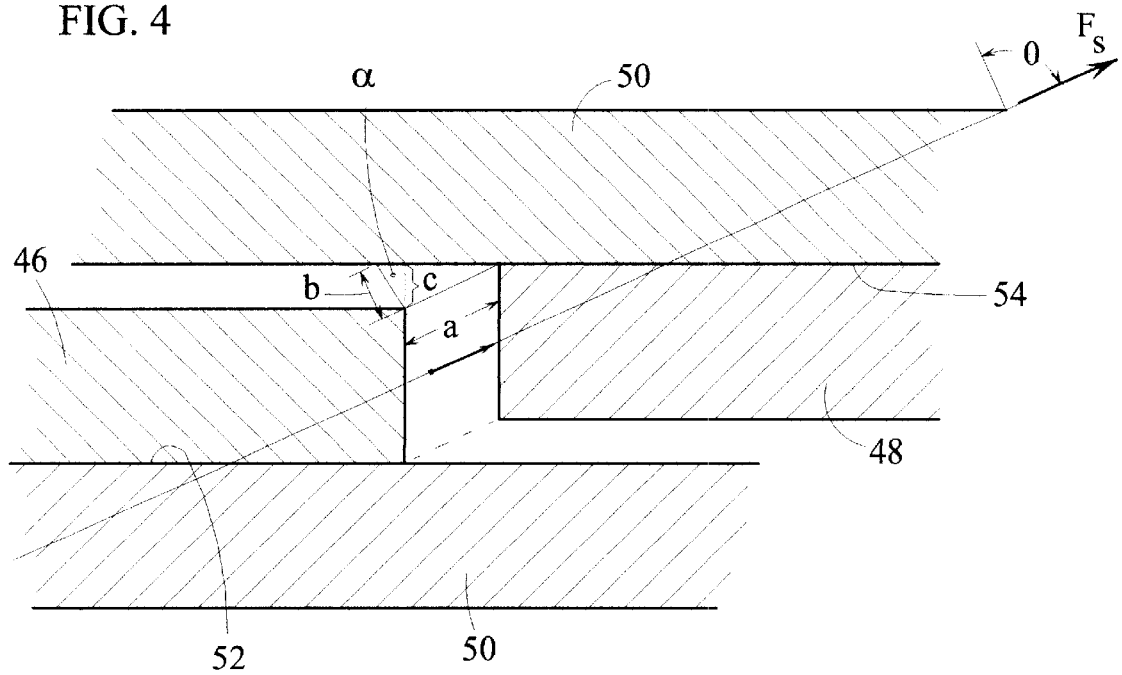
FIG. 4 is a schematic view of the thread contact made between the gear mechanism, and a ball nut drive gear.

Referring now to FIG. 4, threads 46 forming helical gear teeth on the pinion and threads 48 forming helical gear teeth on the sub-pinion engage threads 50 forming helical gear teeth on the drive gear. In particular, as the pinion is urged away from the sub-pinion by the resilient member, threads 46 contact a flank surface 52 of threads 50 while threads 48 contact a facing flank surface 54 of threads 50.

Threads 46, 48, 50 are formed on the pinion, the sub-pinion, and the drive gear at an angle α. As threads 46 formned by helical gear teeth on the pinion contact flank surface 52 of threads 50 formed by helical gear teeth on the drive gear, a clearance c is defined between threads 46 formed by helical gear teeth on the pinion and facing flank surface 54 of threads 50 formed by helical gear teeth on the drive gear. Clearance c is a function of a force, shown at $F_s$, with which the resilient member urges the sub-pinion in a lateral direction to contact opposing flank surface 54. Axial movement of the sub-pinion relative to the pinion is a function of the backlash value b. The value of the axial movement of the sub-pinion corresponds to the distance between thread 46 and facing flank surface 54 along a line of force in the direction of force $F_s$. This axial movement, which is characterized by the variable a, is represented by the equation $$a=b/(\tan \alpha)$$

When $F_s$, through the resilient member, provides sufficient force to overcome clearance c by urging the pinion in one lateral direction while urging the sub-pinion in an opposing lateral direction, both clearance c and backlash b are eliminated. With the elimination of any backlash in the steering gear system, the performance and efficiency of the steering gear system is improved, while the noise level associated with backlash b is eliminated.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the appended claims.

What is claimed is:

1. A steering gear system for an electric power steering system, comprising:
   a motor having a rotor shaft extending therefrom;
   a gearing mechanism, comprising,
      a pinion driven by said motor,
      a sub-pinion in mechanical communication with said pinion,
      at least one spring positioned between an inner surface of said pinion and an outer surface of said rotor shaft, said at least one spring being configured to urge said pinion away from said outer surface of said rotor shaft, and
      a resilient member disposed between said pinion and said sub-pinion, said resilient member being configured to urge said pinion and said sub-pinion in opposing directions; and
   a rack in mechanical communication with said gearing mechanism, said rack having end portions connectable to steerable wheels of a motor vehicle.

2. The steering gear system for the electric power steering system of claim 1 wherein said pinion comprises a body portion and a protrusion depending therefrom.

3. The steering gear system for the electric power steering system of claim 2 wherein said sub-pinion comprises a body portion that is adapted to receive said protrusion depending from said body portion of said pinion.

4. The steering gear system for the electric power steering system of claim 3 wherein a retaining ring is positioned over said protrusion of said body portion of said pinion when said protrusion extends through said body portion of said sub-pinion.

5. The steering gear system for the electric power steering system of claim 3 wherein said protrusion depending from said body portion of said pinion further comprises an outer set of splines disposed on said protrusion and wherein a hole extending through said body portion of said sub-pinion further comprises an inner set of splines disposed on an inner surface thereof, said outer splines and said inner splines being configured to engage each other.

6. The steering gear system for the electric power steering system of claim 3 wherein said sub-pinion further comprises a recess disposed concentrically about a hole extending therethrough, said recess being dimensioned to retain said resilient member, and said recess being configured to accommodate said resilient member such that said resilient member is in direct communication with said pinion and urges said pinion away from said sub-pinion.

7. The steering gear system for the electric power steering system of claim 3 wherein said pinion further comprises a recess disposed concentrically about said protrusion, said recess being dimensioned to retain said resilient member, and said recess being configured to accommodate said resilient member such that said resilient member is in direct communication with said sub-pinion and urges said sub-pinion away from said pinion.

8. The steering gear system for the electric power steering system of claim 1 wherein said at least one spring is frictionally retained between said inner surface of said pinion and said outer surface of said rotor shaft.

9. The steering gear system for the electric power steering system of claim 8 wherein said at least one spring is recessed into said inner surface of said pinion.

10. The steering gear system for the electric power steering system of claim 8 wherein said at least one spring is recessed into said outer surface of said rotor shaft.

11. The steering gear system for the electric power steering system of claim 8 wherein said at least one spring comprises a ring-shaped body portion.

12. The steering gear system for the electric power steering system of claim 3 wherein an outer surface of said pinion and an outer surface of said sub-pinion are configured to threadedly engage a drive gear to effectuate mechanical communication between said rack and said gearing mechanism.

13. The steering gear system for the electric power system of claim 3 wherein an outer surface of said pinion has a sprocket attached thereto and wherein said sprocket is configured to drive said rack with a chain (139) connecting between said sprocket and said rack.

14. The steering gear system for the electric power system of claim 3 wherein an outer surface of said sub-pinion has a sprocket attached thereto and wherein said sprocket is configured to drive said rack with a chain connecting between said sprocket and said rack.

15. The steering gear system for the electric power steering system of claim 1 wherein said rack comprises a ball screw driven by a ball nut in mechanical communication with said drive gear.

16. The steering gear system for the electric power steering system of claim 1 wherein said gearing mechanism is enclosed in a housing.

* * * * *